US007298850B2

(12) United States Patent
Whytock

(10) Patent No.: US 7,298,850 B2
(45) Date of Patent: Nov. 20, 2007

(54) ENCRYPTING KEYPAD MODULE

(75) Inventor: Alexander W. Whytock, Blairgowrie (GB)

(73) Assignee: NCR Corporation, Dayton, OH (US)

( * ) Notice: Subject to any disclaimer, the term of this patent is extended or adjusted under 35 U.S.C. 154(b) by 815 days.

(21) Appl. No.: 10/004,132

(22) Filed: Oct. 23, 2001

(65) Prior Publication Data

US 2002/0066020 A1 May 30, 2002

(30) Foreign Application Priority Data

Nov. 9, 2000 (GB) ................................ 0027327.6

(51) Int. Cl.
*H04L 9/00* (2006.01)

(52) U.S. Cl. ...................... 380/277; 713/190; 713/191; 713/192; 713/171; 713/182; 713/183; 380/273; 380/277; 380/43; 380/264; 380/260; 380/226

(58) Field of Classification Search ........ 713/190–192, 713/182–184, 171; 380/273, 277, 43, 264, 380/260, 226, 228
See application file for complete search history.

(56) References Cited

U.S. PATENT DOCUMENTS

| | | | | |
|---|---|---|---|---|
| 4,578,530 | A * | 3/1986 | Zeidler | 705/71 |
| 4,941,176 | A * | 7/1990 | Matyas et al. | 380/280 |
| 5,142,578 | A * | 8/1992 | Matyas et al. | 380/280 |
| 5,404,403 | A * | 4/1995 | Bright et al. | 380/277 |
| 5,448,638 | A * | 9/1995 | Johnson et al. | 705/72 |
| 5,539,400 | A * | 7/1996 | Mears | 341/22 |
| 5,592,552 | A * | 1/1997 | Fiat | 713/163 |
| 5,745,576 | A * | 4/1998 | Abraham et al. | 705/73 |
| 5,768,386 | A * | 6/1998 | Yokomoto et al. | 713/183 |
| 5,970,146 | A * | 10/1999 | McCall et al. | 713/194 |
| 6,044,155 | A * | 3/2000 | Thomlinson et al. | 713/155 |
| 6,049,790 | A * | 4/2000 | Rhelimi | 705/73 |
| 6,167,137 | A * | 12/2000 | Marino et al. | 380/255 |
| 6,226,749 | B1 * | 5/2001 | Carloganu et al. | 713/201 |
| 6,470,449 | B1 * | 10/2002 | Blandford | 713/178 |
| 6,578,145 | B1 * | 6/2003 | Greene | 713/182 |
| 6,598,023 | B1 * | 7/2003 | Drummond et al. | 705/1 |
| 6,736,313 | B1 * | 5/2004 | Dickson | 235/380 |
| 6,772,331 | B1 * | 8/2004 | Hind et al. | 713/151 |
| 6,823,172 | B1 * | 11/2004 | Forrest | 455/41.2 |
| 7,010,689 | B1 * | 3/2006 | Matyas et al. | 713/168 |
| 7,024,562 | B1 * | 4/2006 | Flink et al. | 713/186 |

FOREIGN PATENT DOCUMENTS

| | | |
|---|---|---|
| GB | 2168514 | 6/1986 |

* cited by examiner

*Primary Examiner*—Bunjob Jaroenchonwanit
*Assistant Examiner*—Lan-Dai T Truong
(74) *Attorney, Agent, or Firm*—Michael Chan

(57) ABSTRACT

An encrypting keypad module (30) comprising a keypad (40) and an encryption unit (42) is described. The encryption unit (42) includes an interpreter (56) for receiving a file (150) containing data and instructions for processing the data. The encryption unit (42) is operable to process the data in the file (150) by interpreting the instructions in the file (150). This enables a file (150) to be used to instruct the encryption unit (42) about the data that is to be operated on and the type of operations to be performed on the data.

5 Claims, 5 Drawing Sheets

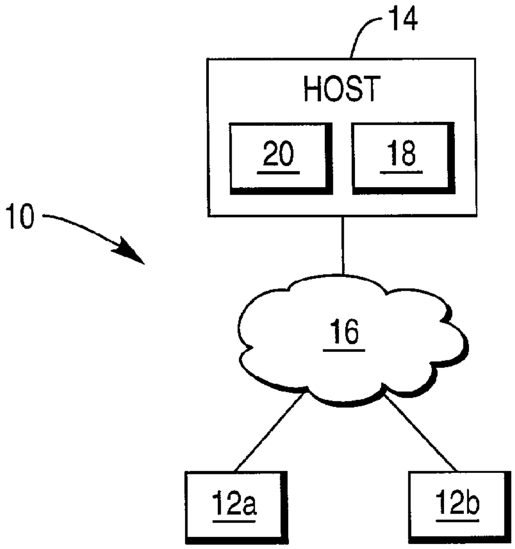
FIG. 1
FIG. 2
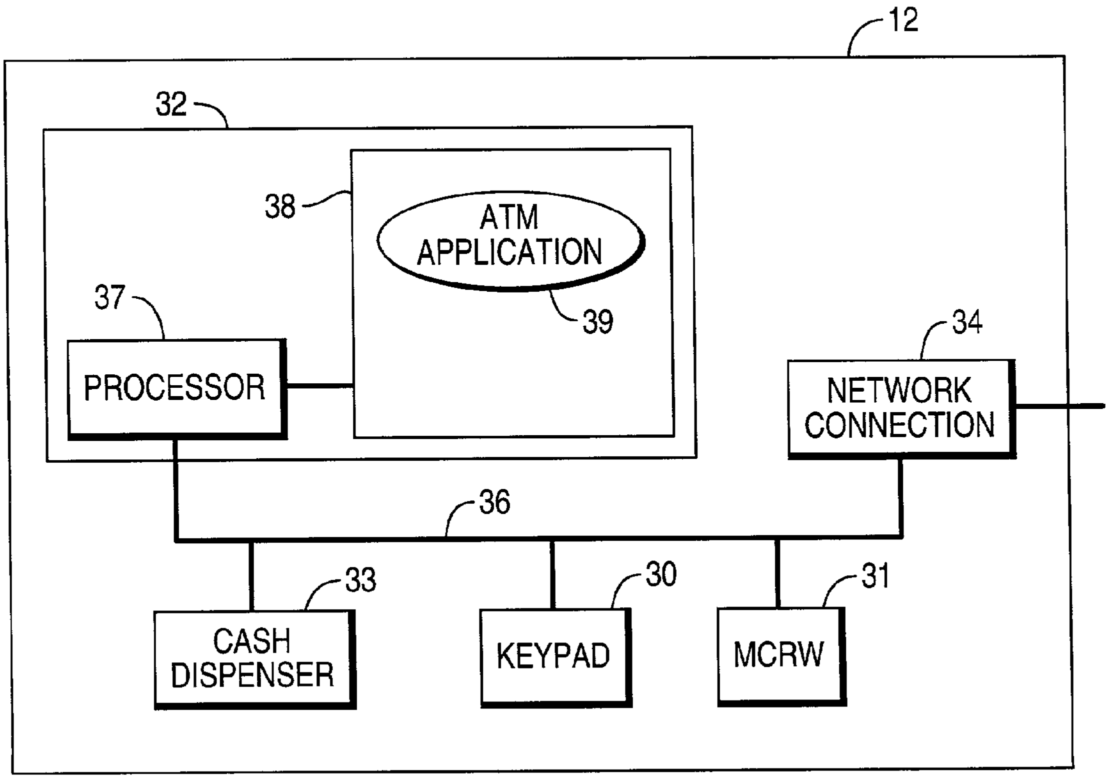

FIG. 6

180

<message>

<encrypt>

<algorithm>2k3des_ecb</algorithm>

<plain text> "ABCDEFGH" </plain text>

<use key> "Key 1" </use key> 182

<cipher text> result 1</cipher text>

</encrypt>

<encrypt>
<algorithm>2k3des_ebc</algorithm>

<plain text> "IJKLMNOP" </plain text>

<use key> "Key 2" </use key> 184

<cipher text> result2 </cipher text>

</encrypt>

<xor> result1,result2, result </xor> 186

</message>

<output message> result </output message> 188

190

<message>

194 192

<input field1> "12345678" </input field1>

<decrypt>

<algorithm>des_ecb</algorithm>

<plain text> input field 1 </plain text>

<use key> Key 1 </use key> 196

<cipher text> result </cipher text>
</decrypt>

<make key>
<xor> result, input field 1, Key 2 </xor> 198

</make key>

</message>

FIG. 7

200

<message>

<input field1> "12345678" </input field1>

<encrypt>

<algorithm>2k3des_ecb</algorithm>

<plain text> input field 1 </plain text>

<use key> Key 1 </use key>

<cipher text> result </cipher text>
</encrypt>

<make key>

<xor> result, input field 1, Key 2 </xor>

</make key>

</message>

FIG. 8

ENCRYPTING KEYPAD MODULE

BACKGROUND OF THE INVENTION

The present invention relates to an encrypting keypad module. In particular, the present invention relates to an encrypting PIN pad (EPP) module for use with a retail point of sale (PoS) terminal or a self-service terminal (SST) such as an automated teller machine (ATM). The invention also relates to a terminal including such an encrypting keypad module.

ATMs require high electronic security because sensitive information, such as a user's personal identification number (PIN), is entered by a user at the ATM. The entered information is conveyed within the ATM and also outside the ATM to an authorization center that authorizes a requested transaction.

To ensure that the user's PIN is not divulged by the ATM after it has been entered by the user, a tamper-resistant integral unit is provided having a keypad and an encryption unit. The integral unit is referred to as an encrypting PIN pad (EPP) module.

Once a user has entered his/her PIN, the EPP encrypts the entered digits to ensure that the digits are encrypted prior to leaving the EPP. This ensures that a user's PIN is never conveyed (either within or outside the ATM) as plaintext.

The EPP includes an encryption unit having a random number generator, a cryptographic processor, a non-volatile memory for storing a unique master encryption key and an encryption algorithm, and a volatile memory for storing customer-specific encryption keys, such as a key exchange key and a PIN key.

Typically, when an EPP is manufactured the unique master key is generated by the cryptographic processor within the EPP and stored in the non-volatile memory (which may be EEPROM or battery-backed RAM). The encryption algorithm to be used by the module is also loaded into the non-volatile memory during manufacture of the EPP. The algorithm may be, for example, the data encryption standard (DES).

If the EPP is tampered with, for example by a third party attempting to gain access to it, then the EPP deletes the master key stored in the non-volatile memory, and any other keys stored in the volatile memory.

When a user enters his/her PIN at an ATM, the EPP uses its PIN key and the stored encryption algorithm (such as DES) to encrypt the entered digits using a standard protocol. The result of this encryption on the entered digits is generally referred to as a PIN block.

A protocol (also referred to as a framework) indicates how a cryptographic processor is to operate on data, how the processor is to use encryption keys, what type of algorithm is to be used for encryption, and such like.

A number of different protocols exist, some of these are described in international standards, such as: ANSI standard X9.8 "PIN management and security", ANSI X9.9 "Financial institution message authentication", ANSI X9.17 "Financial institution key management", Australian standard for electronic funds transfer AS 2805, and such like.

The PIN block is then transmitted from the EPP to an ATM controller, which transmits the PIN block (together with the requested transaction, and typically a sequence number and a date/time stamp) to an authorization center. The authorization center decrypts the encrypted PIN block to verify the claimed identity of the user, and authorizes a requested transaction if sufficient funds are present.

One problem associated with current EPPs is that it is difficult to change the protocol used by the EPP. Another problem is that it is difficult to derive new keys for current EPPs. There are a number of reasons for these problems. To upgrade the EPP protocol and to derive new keys, a complex application programming interface (API) must be used. In addition, the ATM application program is constrained so that only certain functions can be performed relating to deriving new keys and upgrading protocols. Furthermore, the architecture of an EPP is typically vendor-specific, so an ATM application program may have to be changed if a new type of EPP is used in the ATM.

Thus, when a new key is to be derived, or when a new protocol is to be implemented, on a network of ATMs having different types of EPPs (that is, EPPs from different vendors), then each type of EPP requires different instructions. This makes upgrading the ATM network a time-consuming, complex, and expensive task. However, to ensure high levels of data security, EPPs in ATM networks have to be upgraded frequently.

SUMMARY OF THE INVENTION

It is among the objects of an embodiment of the present invention to obviate or mitigate one or more of the above disadvantages or other disadvantages associated with encrypting keypad modules.

According to a first aspect of the present invention there is provided an encrypting keypad module comprising a keypad and an encryption unit, characterized in that the encryption unit includes an interpreter for receiving a file containing data and instructions for processing the data, whereby the encryption unit is operable to process the data in the file by interpreting the instructions in the file.

By virtue of this aspect of the invention, the module is able to receive data and instructions from a source external to the module, and to process the data and any entered PIN, according to the instructions received. This obviates the requirement to pre-load protocols, as a protocol can be described by the file.

This has the advantage that a standard set of instructions can be used for any such module, regardless of the architecture of the module, as the interpreter is able to translate the instructions into code that a cryptographic processor can execute.

Preferably, the interpreter is implemented in software or firmware.

The file may include instructions for deriving a new key based on an existing key and new data contained in the file.

The file may have a structure comprising tagged commands and data, in a similar manner to a standard mark up language such as XML.

Preferably, the encrypting keypad module is a single integrated unit.

According to a second aspect of the present invention there is provided a terminal including an encrypting keypad module, characterized in that the module has an encryption unit including an interpreter for receiving a file containing data and instructions for processing the data, whereby the encryption unit is operable to process the data in the file by interpreting the instructions in the file.

The terminal may be a point of sale terminal or a self-service terminal such as an ATM.

According to a third aspect of the present invention there is provided a method of encrypting data in an encryption module, the method comprising the steps of: receiving data to be encrypted and instructions for encrypting the data from a source external to the module; interpreting the instructions to generate code for implementing the instructions; and applying the code to a cryptographic processor.

BRIEF DESCRIPTION OF THE DRAWINGS

These and other aspects of the present invention will be apparent from the following specific description, given by way of example, with reference to the accompanying drawings, in which:

FIG. 1 is a block diagram of a self-service terminal system according to one embodiment of the present invention;

FIG. 2 is a simplified block diagram of a self-service terminal of FIG. 1;

FIG. 6 is another example of a program listing of a file used by the SST of FIG. 2;

FIG. 7 is another example of a program listing of a file used by the SST of FIG. 2; and FIG. 8 is another example of a program listing of a file used by the SST of FIG. 2.

DETAILED DESCRIPTION

Figure 3:
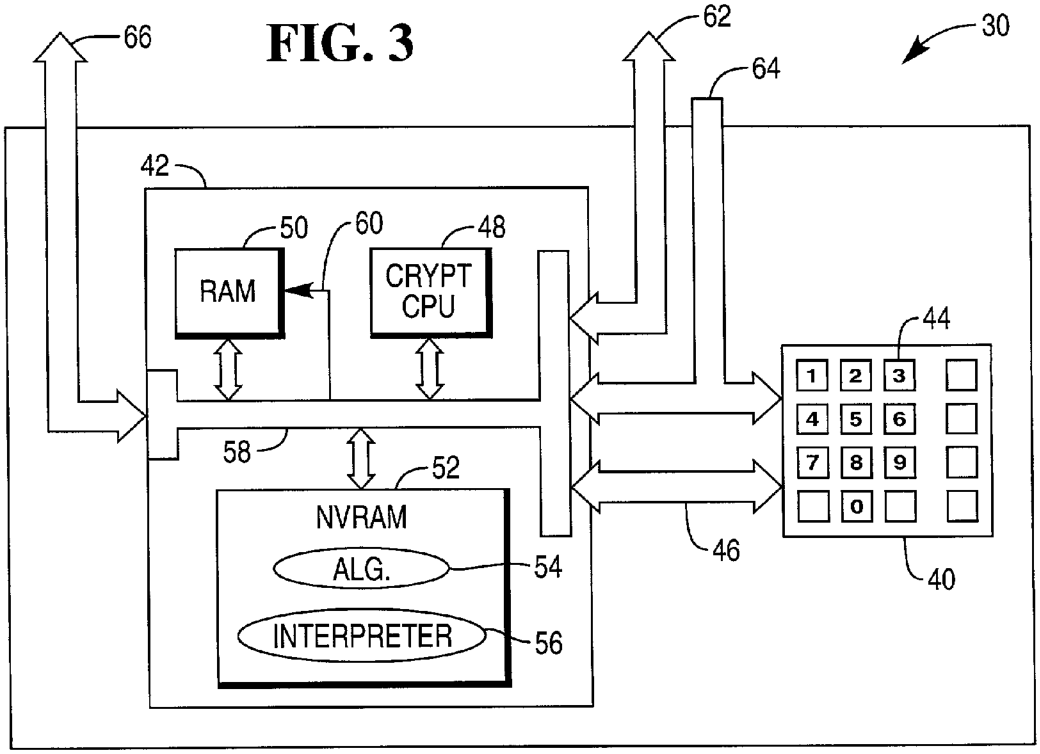
FIG. 3 is a schematic diagram of an encrypting keypad module of the SST of FIG. 2.

Reference is now made to FIG. 1, which is a block diagram of a self-service terminal system 10 according to one embodiment of the present invention. In FIG. 1, system 10 comprises a plurality of self-service terminals 12 (in the form of ATMs) connected to a transaction host 14 by a secure private network 16.

The transaction host 14 is owned and operated by a financial institution and includes an authorization facility 18 and a back-office facility 20. As is well known in the art, the authorization facility 18 authorizes transactions received from the ATMs 12.

The back-office facility 20 typically includes details of bank accounts held by customers of the financial institution and stores information relating to transactions executed at the ATMs 12.

Referring now to FIG. 2, which is a block diagram of one of the ATMs 12 of FIG. 1, each ATM 12 includes: a tamper-resistant encrypting keypad module 30 in the form of an EPP module; a motorized card reader (MCRW) module 31; a central controller 32; a cash dispenser module 33; and a network connection module 34; all interconnected by an ATM bus 36. The controller 32 further comprises a processor 37 and associated memory 38. In use, the memory 38 executes an ATM application program 39 for controlling the operation of the ATM 12.

Each ATM 12 also includes conventional ATM modules (such as a receipt printer, a journal printer, and such like) that are coupled to the ATM bus 36, which are not illustrated in FIG. 2 and are not described in detail herein.

Referring now to FIG. 3, which is a schematic diagram of the EPP module 30, the EPP 30 includes a keypad 40 and an encryption unit 42.

The keypad 40 comprises sixteen individual keys 44, each key having a surface that is either blank or provided with a legend. Those keys having a legend have either a numeral (such as "1", "2", or such like) or a word (such as "Enter", "Cancel", or such like) etched or printed on the surface of the key 44.

Data from the keypad 40 is transmitted to the encryption unit 42 via a tamper-detecting bus 46. Bus 46 includes the scan out lines that indicate which key is depressed. Bus 46 is enveloped by a membrane shield (not shown) that detects any attempt to access the data lines in the bus 46 covered by the shield.

The encryption unit 42 has a cryptographic processor 48 in the form of a general cryptographic device. Suitable cryptographic devices are available from: Pijnenburg Custom Chips B.V., Dallas Semiconductor Corporation, or Philips Crypto B.V. (such as the Philips General Crypto Device GCD-PHI). The processor 48 has associated volatile memory 50 in the form of RAM (which has a battery back-up), and non-volatile memory 52 in the form of EEPROM.

The RAM 50 stores a master key which was loaded during manufacture. The EEPROM 52 stores at least one encryption algorithm 54 (in this embodiment triple DES) which was also loaded during manufacture. The EEPROM 52 also stores an interpreter program 56 that is loaded into RAM 50 on power-up of the EPP 30.

The processor 48, RAM 50, and EEPROM 52 communicate via an internal bus 58.

Unit 42 includes a tamper-detecting membrane (not shown) for detecting any attempt to open or otherwise access the unit 42.

The unit 42 also includes an erase line 60 coupled to the RAM 50. If any of the tamper-detecting membranes detects a breach, then the processor 48 activates erase line 60 to delete the master key stored therein.

Unit 42 is also coupled to function display keys (FDKs) (not shown) via bus 62. FDKs typically comprise two columns of keys, each column being located on an opposite side of a display, so that the FDKs align with options presented on the display, and a user can select an option by depressing an FDK aligned with that option.

The keypad 40 and encryption unit 42 each receives power via bus 64; and the encryption unit 42 outputs encrypted data to the ATM controller 32 (FIG. 2) via bus 66.

When the keypad module 30 is connected to an ATM 12 (FIG. 2), power is connected to bus 64; an FDK input, if used, is connected to bus 62; and a communications bus is connected to bus 66.

Figure 4:
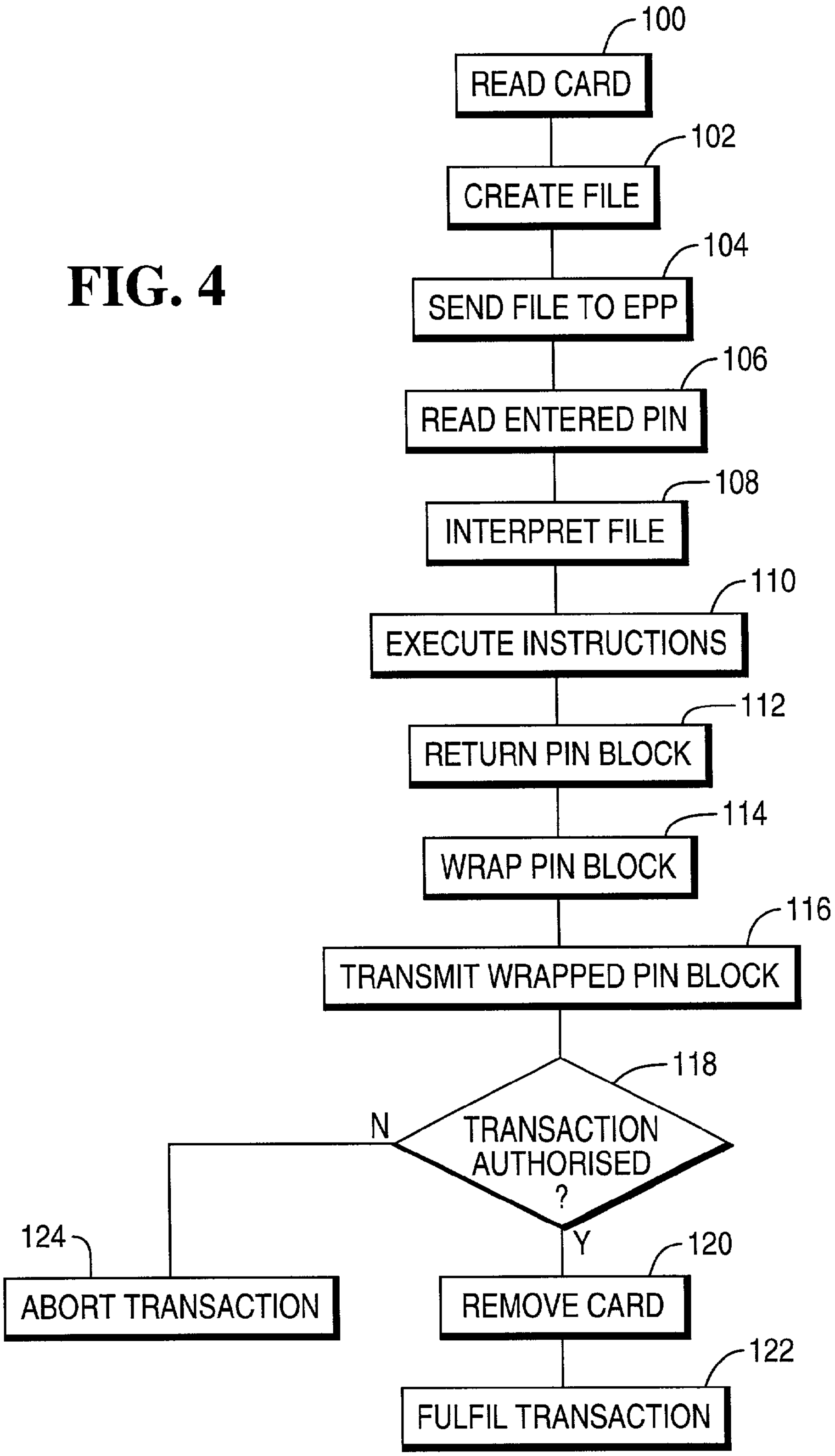
FIG. 4 is a flowchart illustrating the steps involved in a typical transaction at the SST of FIG. 2.

A typical transaction will now be described with reference to FIGS. 1 to 3, and also FIG. 4, which is a flowchart illustrating the steps involved.

Initially, a user enters a card into MCRW module 31. The MCRW 31 reads the card (step 100) to determine account information such as the account number and the card issuer, and conveys this account information to the ATM application program 39. ATM program 39 creates a file (step 102) containing this account information (the file will be described in more detail below) and some instructions.

The ATM application 39 then sends this file (step 104) to the EPP 30, and invites the user to enter his/her PIN at the EPP 30.

The EPP 30 reads the PIN entered by the user (step 106), interprets the received file (step 108) and executes the instructions contained in the received file (step 110) using the PIN and the account information, so that a PIN block is generated.

The EPP 30 then sends the PIN block (step 112) to the ATM application 39, which appends (step 114) a sequence number, transaction details (for example, the amount of cash to be withdrawn), and a time and date stamp thereto to generate a wrapped PIN block.

The ATM application 39 then sends (step 116) the wrapped PIN block to the transaction host 14 for authorizing (step 118).

If the transaction host validates the transaction then the ATM application invites the user to remove the card (step 120) then fulfills (step 122) the transaction (for example, by dispensing the requested cash).

If the transaction host does not validate the transaction then the ATM application aborts the transaction (step 124).

Figure 5:
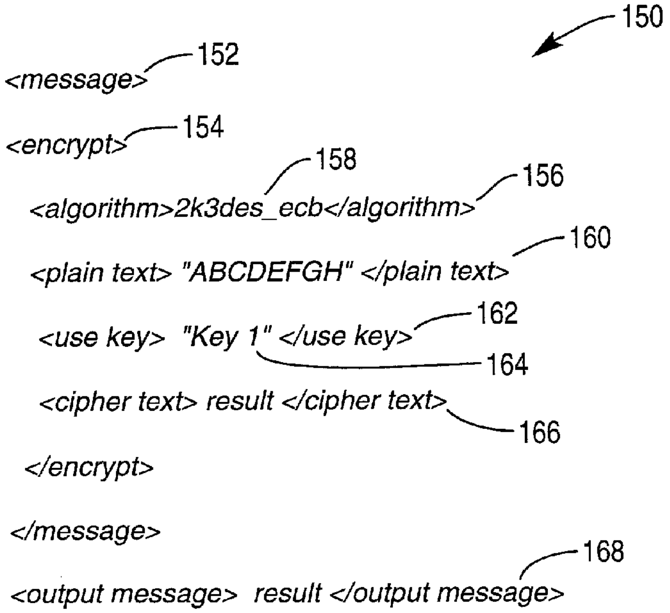
FIG. 5 is an example of a program listing of a file used by the SST of FIG. 2.

The account file created in step 102 of FIG. 4 will now be described in more detail with reference to FIG. 5, which is a program listing of the file 150.

The file 150 has an instruction tag 152 (in the form of an element called "message") indicating that what follows is a set of instructions.

In the format shown, as is conventional for markup languages, each element is activated by a tag comprising an identifier surrounded by angled brackets, and deactivated by a tag comprising an identifier preceded by a forward slash character and surrounded by angled brackets.

After the instruction tag there is an encryption tag 154 indicating that what follows is an encryption routine having instructions for encrypting data.

The encryption routine has an algorithms tag 156 including an algorithm code 158 indicating the type of algorithm to be used in the encryption process. In this embodiment, the algorithm code 158 is "2 k3des_ecb", which indicates that the two key triple DES algorithm is to be used in electronic code book mode of operation. Although only one algorithm is shown in the EPP of FIG. 3, in other embodiments, a plurality of algorithms may be stored, so that the account file 150 determines which algorithm is to be used.

The encryption routine also has a plain text tag 160 including data to be operated on. In this embodiment, the plain text is the account number read from the user's card in step 100.

The encryption routine also has a use key tag 162 including a key code 164 indicating which of the stored keys is to be used in the encryption process. In this embodiment, the code is "Key 1", which indicates that the key labeled "Key 1" and stored in the EPP is to be used.

The encryption routine also has a use cipher text tag 166 indicating that the results of the two key triple DES encryption using "Key 1" on the entered PIN and the account information should be referenced by the name "result"; that is, the PIN block generated is referenced by the name "result".

The file 150 also has an output tag 168 that instructs the EPP to send the encrypted PIN block to the ATM application program 39.

When this file 150 is received by the EPP 30, the EPP 30 interprets each command to generate the cryptographic processor codes required to instruct the application programming interface in the encryption unit to execute the functions required.

A different account file 180 is shown in FIG. 6. Account file 180 has a first block of commands 182 for performing two key DES encryption on a first string of text using "Key 1", and a second block of commands 184 for performing two key DES encryption on a second string of text using "Key 2", an operand tag 186 for instructing an exclusive OR (XOR) function to be performed on the result of the first and second encryption routines, and an output tag 188 that instructs the EPP to send the output of the XOR function to the ATM application program 39.

It will be appreciated that each of the blocks of commands comprises tags indicating an operation to be performed or data to be used; however, for clarity of explanation, tags have been grouped to indicate the function performed by that group.

Yet another account file 190 is shown in FIG. 7. Account file 190 enables a new key to be derived using a key already loaded into the EPP. Account file 190 has a numeral input tag 192 having a string of numbers 194, and a decryption block of commands 196 indicating what algorithm and key is to be used to decrypt the numbers 194. Account file also has a key producing block 198 indicating how the decrypted numbers are to be used with the string of numbers 194 to produce a new key.

Thus, the key derivation account file 190 does not involve a user entering any data, it is used by an owner or operator of the ATM to update the encryption in the ATM.

Yet another account file 200 is shown in FIG. 8. Account file 200 enables a new longer key to be derived by using a triple DES algorithm.

It will be appreciated that this embodiment of the invention has several advantages. It enables an ATM, or a host remote from the ATM, to send an electronic file to an EPP instructing the EPP to process data in a specified manner. It also enables a single file to be used that specifies data to be operated on and the algorithms and modes to be used in operating on that data, thus a single file contains both data and instructions. It simplifies key derivation by using a single file, and enables key derivation to be initiated from a location remote from an ATM. This enables a central location to update multiple ATMs with new keys without having to send personnel to each ATM. The markup language format used for the file enables the file to be easily generated and understood by a human.

Various modifications may be made to the above described embodiment within the scope of the invention, for example, in other embodiments, the encrypting keypad may be used in a point of sale terminal, and the point of sale terminal may be connected to an open and public network.

What is claimed is:

1. A method of deriving a new encryption key for use in an encrypting keypad module, the method comprising:

receiving a file containing (i) input data, (ii) a first command indicating an algorithm, (iii) a second command indicating an encryption key which is already stored at the encrypting keypad module, and (iv) instructions for making a new encryption key;

using the indicated algorithm and the indicated encryption key to decrypt the input data; and executing the instructions to direct how the decrypted input data is to be operated on to produce a new encryption key which is different from the encryption key which is already stored at the encrypting keypad module.

2. A method according to claim 1, further comprising:

storing the new encryption key in the encrypting keypad module.

3. A method according to claim 1, wherein the file has a structure comprising tagged commands and data.

4. A method of operating an encrypting keypad module having a first encryption key which is already stored at the encrypting keypad module, the method comprising:

receiving a file containing (i) input data, (ii) a command indicating an algorithm, and (iii) instructions for making a new encryption key which is different from the first encryption key;

using the indicated algorithm and the first encryption key to decrypt the input data;

executing the instructions to direct how the decrypted input data is to be operated on to produce a second encryption key which is different from the first encryption key which is already stored at the encrypting keypad module; and storing the second encryption key in the encrypting keypad module.

5. A method according to claim 4, wherein the file has a structure comprising tagged commands and data.

* * * * *